(No Model.)
J. H. THOMAS & D. B. HISER.
WHEEL.
No. 489,880. Patented Jan. 10, 1893.
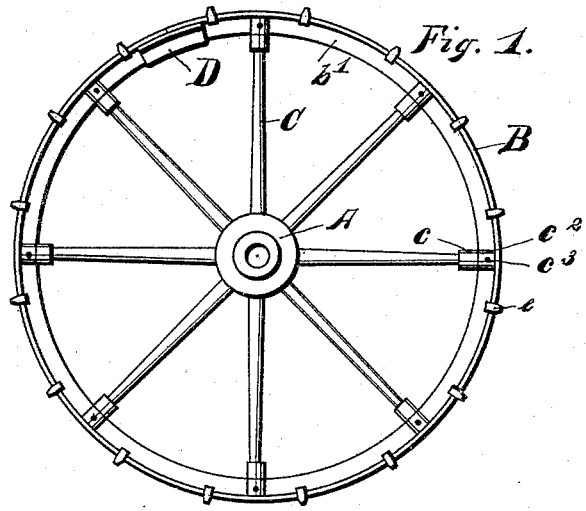
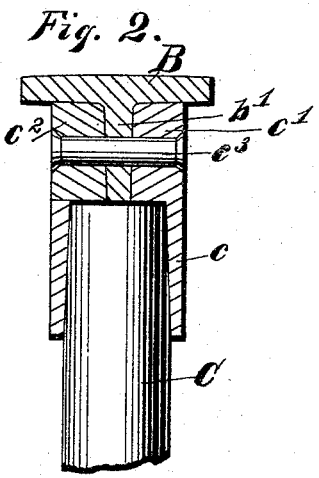
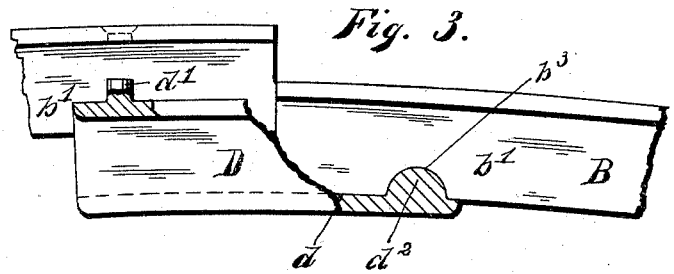
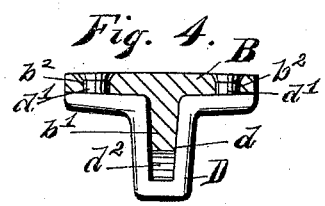
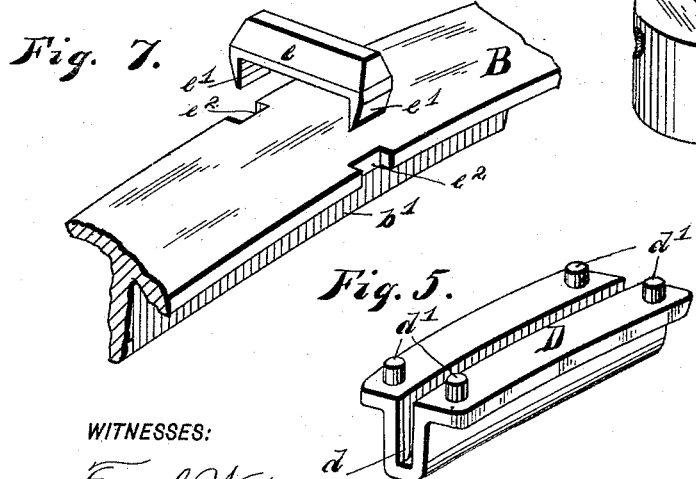
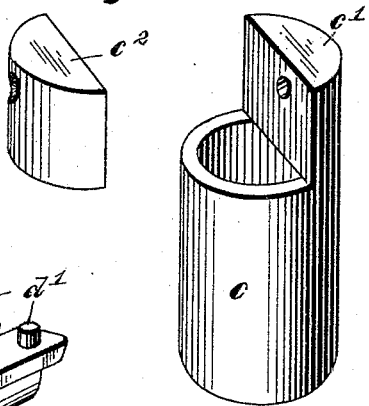
WITNESSES:
Frank Watt
H. O. Oster
INVENTORS:
John H. Thomas
Daniel B. Hiser
BY
Attorneys

UNITED STATES PATENT OFFICE.

JOHN H. THOMAS AND DANIEL B. HISER, OF SPRINGFIELD, OHIO, ASSIGNORS TO THE THOMAS MANUFACTURING COMPANY, OF SAME PLACE.

WHEEL.

SPECIFICATION forming part of Letters Patent No. 489,880, dated January 10, 1893.

Application filed July 8, 1892. Serial No. 439,313. (No model.)

*To all whom it may concern:*

Be it known that we, JOHN H. THOMAS and DANIEL B. HISER, citizens of the United States, residing at Springfield, in the county of Clark and State of Ohio, have invented certain new and useful Improvements in Wheels, of which the following is a specification.

Our invention relates to improvements in wheels, and the objects of our invention are to provide a wheel which will be cheap of construction and durable. We attain these objects by the constructions shown in the accompanying drawings, in which, Figure 1 is a side elevation of a wheel embodying our invention. Fig. 2 is a sectional view of the same, the section being taken through the wheel rim at a point where a spoke is joined to said rim. Fig. 3 is a side elevation of a portion of the wheel rim, illustrating the method of joining the ends of the rim together, parts of the joining plate being broken away to more clearly show the construction. Fig. 4 is a view, partly in section, showing the end of the joining plate and the rivets passing through the rim. Fig. 5 is a view in perspective showing the joining plate detached from the rim. Fig. 6 is a perspective view of the thimble, or ferrule, and an auxiliary piece, by which the spokes are attached to the rim. Fig. 7 is a view in perspective of a portion of the wheel rim, showing the method of securing a cleat thereon.

Like parts are represented by similar letters of reference in the several views.

In the said drawings A, represents the hub, which may be made either of metal or wood; B, represents the rim; C, represents the spokes.

We preferably make the rim B, of a single piece of T-iron, bent into a circular form, with that flange of the iron which represents the stem of the T, and which we term the vertical flange, turned inwardly and lying in the plane of the wheel.

For the purpose of holding the end of the rim together, we employ a connecting plate D, T-shaped in cross section, having a channel $d$, cut through the middle thereof, to receive the vertical flange $b'$, of the rim, and of a shape to fit closely against the inner surface of the rim proper or horizontal flange. Formed integral with the plate D, and projecting therefrom are studs or rivets $d'$, adapted to enter and be riveted in the holes $b^2$, in the horizontal flanges of the rim. To further provide for holding the ends of the rim together and to relieve the rivets of a portion of the strain, we form ribs $d^2$, extending across and near the ends of the channel $b$, in the plate D, adapted to fit into correspondingly shaped notches $b^3$, in the vertical flange $b'$, of the rim.

The spokes C, are fastened in the hub in any desirable manner; for the purpose of securing them to the wheel rim we provide a ferrule $c$, adapted to fit over the outer extremities of the spokes. On the end of the ferrule and to one side of the middle thereof is formed a lug $c'$, of a length equal to the width of the vertical flange $b'$, and having one face adapted to fit against the side of said flange, the other face being a continuation of the external surface of the ferrule. To provide for closing the end of the ferrule and forming a bearing seat for the spoke, we employ an auxiliary piece $c^2$, of substantially the same size and form as the lug, adapted to be placed on the end of the ferrule on the side opposite to the lug $c'$; a bolt or rivet $c^3$, passing through the lug, the vertical flange $b'$, and the auxiliary piece secures the parts together.

By the above construction the spokes are secured centrally to the rim, the wheel is balanced and presents a uniform and finished appearance.

If it is desired to provide the wheels with spurs at intervals around its circumference, we provide a cleat $e$, of a length approximately equal to the width of the rim and having projections $e'$ $e'$, near its ends adapted to enter the notches $e^2$ $e^2$, cut into the edges of the wheel rim opposite to each other, the projections being of sufficient length to allow them to be clinched on the inner side of the rim, thus securing the spur firmly to the wheel.

Having thus described our invention, we claim:

1. In a wheel having a rim made of T iron, so as to form a central vertical flange on the inner periphery thereof, spokes for supporting said rim, each of said spokes being provided with an encircling ferrule adapted to rest on said vertical flange, said ferrule being provided with a projecting lug and an auxiliary piece adapted to embrace said vertical flange, and means for securing said parts together through said flange, substantially as specified.

2. In a wheel having a rim made of T iron so as to form a central vertical flange on the inner periphery thereof, as described, spokes for supporting said rim, two part connecting devices on the ends of said spokes, each consisting of a ferrule to embrace the end of said spoke, and a projecting lug and auxiliary piece of a length equal to the depth of said flange and adapted to be connected to said flange, so as to form a bearing for the end of said spoke, substantially as specified.

3. In a wheel having a rim made of T iron with a central vertical flange, a plate for connecting the ends of said rim, said plate being provided with a channel adapted to embrace said central flange, transverse ribs in said channel adapted to engage similar notches in the rim flange, and studs or rivets formed integral with said plate to enter corresponding openings in the wheel rim, substantially as specified.

4. In a wheel, a rim having side notches in the edges thereof, a cleat provided with projecting spurs adapted to enter said notches, said spurs being adapted to be clinched on the inner side of said rim, substantially as specified.

5. In a wheel having a rim made of T iron, spokes connected to said rim by means of two part ferrules, as described, a channel plate for connecting the ends of said rim said plate being provided with integrally formed projections to engage in openings in said rim, said rim being provided with side notches, and cleats having projecting spurs to engage in said notches so as to be secured to said rim by riveting, substantially as specified.

6. The combination with a wheel rim having a central vertical flange, of a two part ferrule adapted to embrace said central flange, and means for connecting the parts of said ferrule through said flange, said two part ferrule being provided with a solid portion of a length equal to the depth of said flange, whereby a solid bearing seat is formed at the bottom of said ferrule to receive the spoke inclosed by said ferrule, substantially as specified.

In testimony whereof we have hereunto set our hands this 6th day of July, A. D. 1892.

JOHN H. THOMAS.
DANIEL B. HISER.

Witnesses:
A. N. SUMMERS,
J. P. MARTINDELL.